L. LEVENS.
HAY WAGON.
APPLICATION FILED APR. 18, 1917.
1,265,096.
Patented May 7, 1918.
2 SHEETS—SHEET 2.
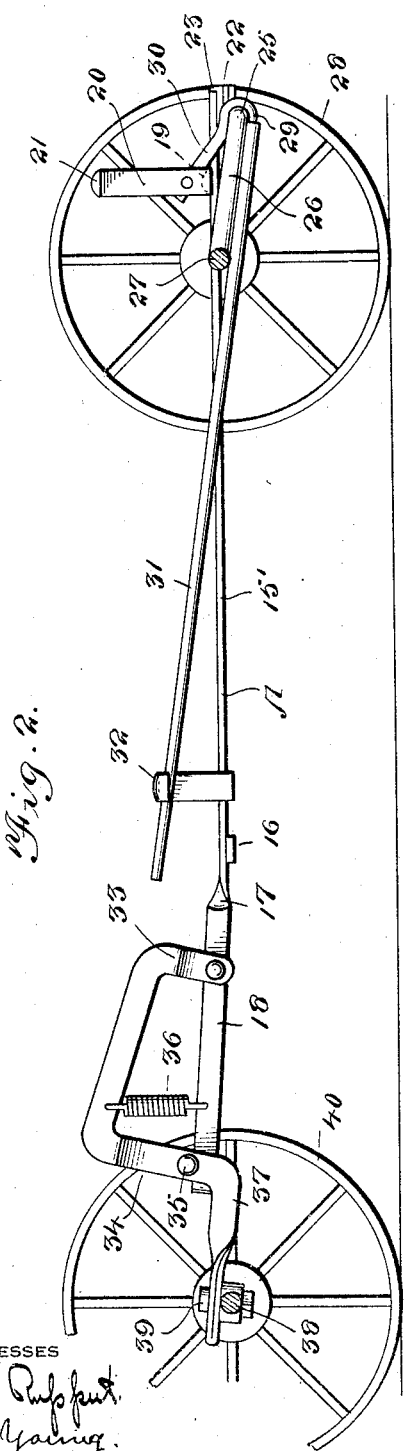
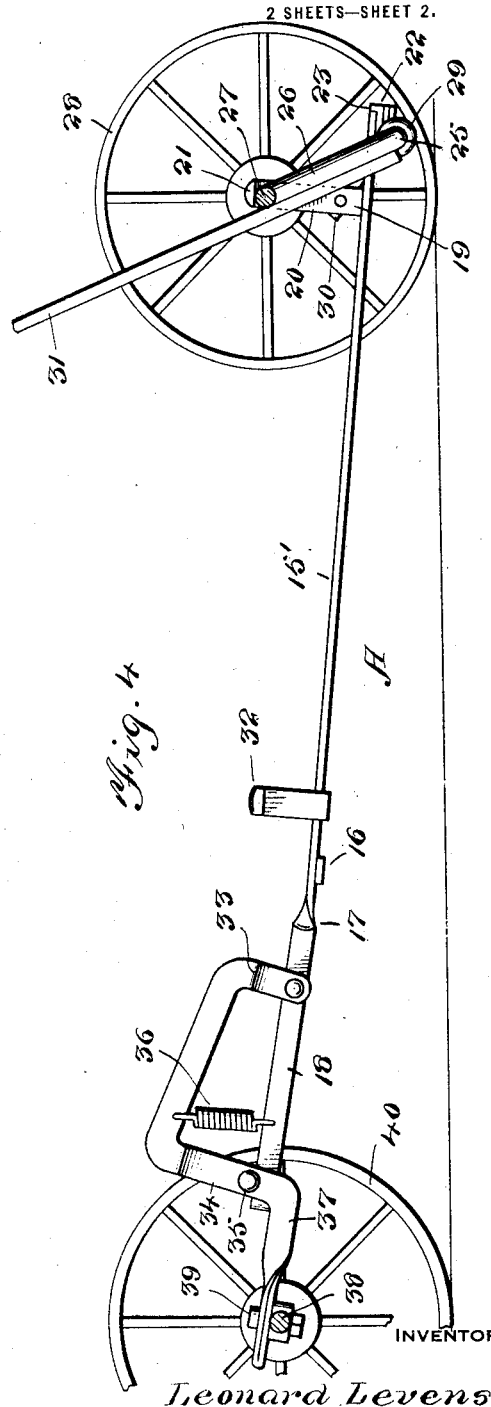
WITNESSES
E. P. Culpfut.
E. E. Young.
INVENTOR
Leonard Levens
BY Victor J. Evans
ATTORNEY

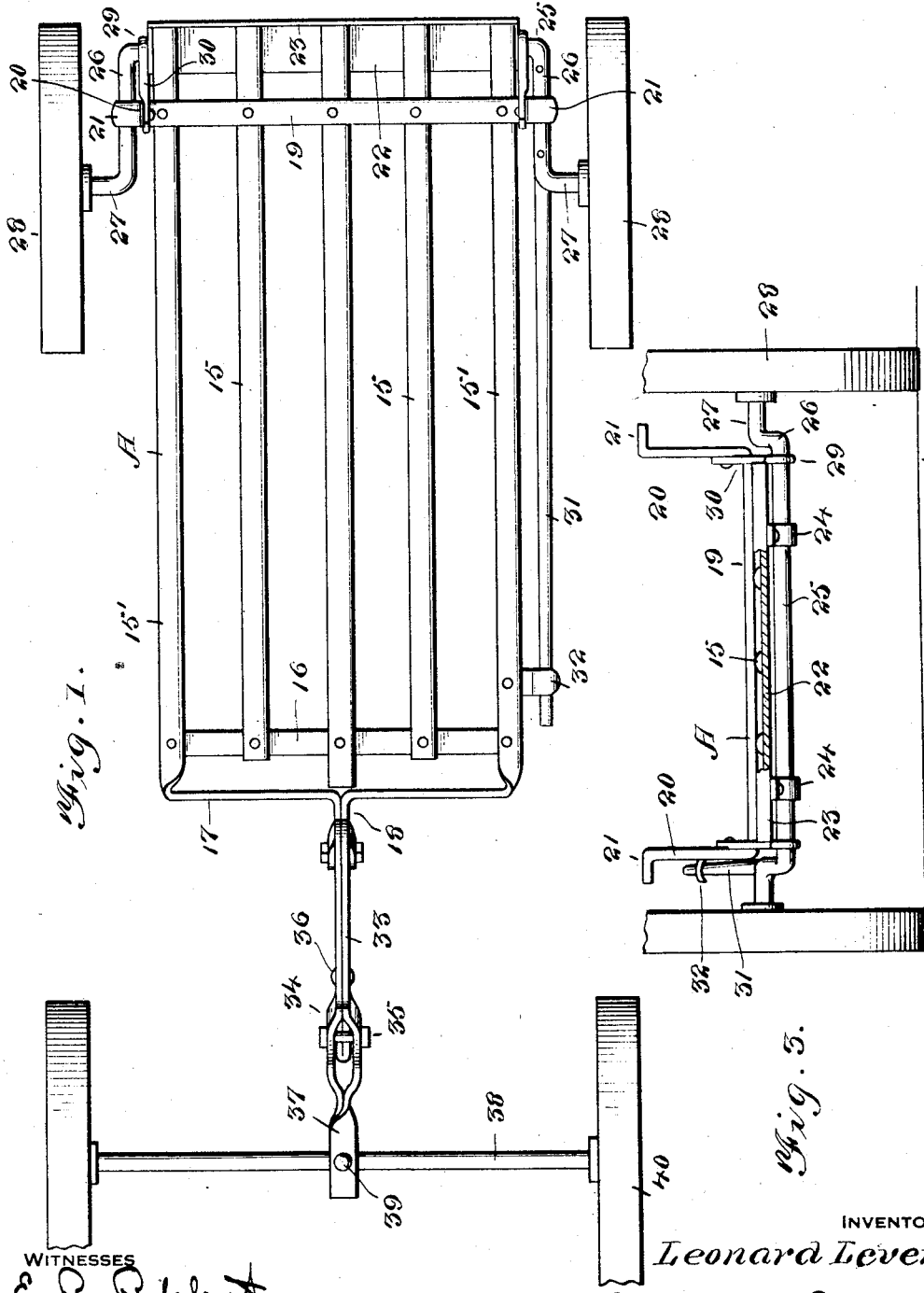

UNITED STATES PATENT OFFICE.

LEONARD LEVENS, OF CENTRALHATCHEE, GEORGIA.

HAY-WAGON.

1,265,096.	Specification of Letters Patent.	Patented May 7, 1918.

Application filed April 18, 1917. Serial No. 163,077.

*To all whom it may concern:*

Be it known that I, LEONARD LEVENS, a citizen of the United States, residing at Centralhatchee, in the county of Heard and State of Georgia, have invented new and useful Improvements in Hay-Wagons, of which the following is a specification.

This invention relates to hay wagons, and it has for its object to produce an improved wagon of simple construction whereby the labor of gathering and saving hay will be greatly facilitated and the expense connected with such labor reduced.

A further object of the invention is to produce a hay wagon comprising a wheeled platform which will be tiltably supported at one end in such manner that when a load has been accumulated thereon that end may be lowered substantially to the ground and the platform dragged from beneath the load which will thus be left standing in the form of a stack.

A further object of the invention is to produce a device of the class described including a wheeled platform supported tiltably at one end and having at the other end a spring support whereby such spring supported end will be caused to sag when the platform is loaded.

A further object of the invention is to produce a device of the character described including a wheeled platform composed mainly of a plurality of longitudinally disposed spaced bars between which a portion of the load will sag so as to contact with the ground when the platform is lowered, thereby establishing frictional contact between the load and the surface of the ground, enabling the platform to be dragged from beneath the load, leaving the latter standing.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the claims may be resorted to when desired.

In the drawings,—

Figure 1 is a top plan view of a device constructed in accordance with the invention.

Fig. 2 is a side elevation partly in section.

Fig. 3 is a rear elevation partly in section.

Fig. 4 is a view similar to Fig. 2 but showing the rearward end of the platform in a lowered position.

Corresponding parts in the several figures are denoted by like characters of reference.

The platform A of the improved device is composed mainly of a plurality of longitudinally disposed bars 15, said bars being flat, half round or of other appropriate cross section. Said bars are spaced apart and connected together near their front ends by means of a cross bar 16 which is riveted or otherwise secured on the under faces of said bars. The two outermost longitudinal bars which are specially designated by 15' are connected together by a front bridge piece 17 having a forwardly extending reach bar 18. The longitudinal bars of the platform are connected together and spaced apart near their rearward ends by a cross bar 19 which is provided at the ends thereof with upwardly extending brackets 20 having terminal lugs or offsets 21 at their upper ends. A cross bar 22 which is secured on the under faces of the longitudinal bars of the platform adjacent to the rear ends thereof is provided with an upstanding flange 23 on which the rearward extremities of the platform bars 15, 15' abut. The cross bar 22 is provided on its underside with boxes 24 affording bearings for the crank portion 25 of an axle, the limbs of which, 26, are provided with spindles 27 carrying the wheels 28. Additional bearings for the crank portion of the axle are provided by eyes 29 formed at the rearward ends of arms or brackets 30 that are fixed upon and extend rearwardly and downwardly with respect to the upstanding brackets 20 of the cross bar 19. Connected with one of the limbs 26 of the axle is a lever 31 whereby the crank axle may be tilted or adjusted so as to raise or lower the rearward portion of the platform, the extent of the movement being limited by the lugs 21 at the upper ends of the brackets 20, said lugs lying in the path of the limbs of the axle, and said lugs being so positioned as to intercept the downward movement of the rearward portion of the platform before said rearward portion contacts with the ground. A hook 32 fixed on the platform near the forward end thereof serves to engage and to hold the lever 31 when the rearward end of the platform is in a raised position.

Pivoted on the reach bar 18 near the bridge piece 17 is one limb of a yoke 33, said yoke extending forwardly above the reach bar, and the forward limb of said yoke being forked at 34 to straddle the forward end of the reach bar, a stop member 35 being provided to limit the upward movement of the reach bar in the fork. The bridge portion of the yoke 33 is connected with the reach bar by a coiled spring 36 whereby the reach bar is maintained normally in contact with the stop member 35. The front limb of the yoke is provided with a forwardly extending arm 37 with which the front axle 38 is pivotally connected by a king bolt 39, said axle being provided with ground wheels 40.

It will be readily seen from the foregoing description that when a load is placed on the platform, the forward end of said platform will gradually sag under the weight of the load, the spring 36 being gradually placed under tension as the load accumulates. When a sufficient load has been placed on the platform the vehicle is drawn to the stacking place where, by simply disengaging the lever 31 from the hook 32, said lever may be utilized to lower the rear end of the platform, by tilting the crank portion of the axle about the axis of the spindle, until the limbs of the axle abut on the stop members formed by the lugs 21, said stop members being so arranged as to intercept the downward movement of the rearward end portion of the platform when the latter is still a short distance above the ground. Owing to the construction of the platform which is formed mainly of the longitudinally disposed bars 15, 15', a portion of the load will sag between said bars and will rest upon and frictionally engage the surface of the ground, thus permitting the platform to be drawn from beneath the load which will be left standing on the ground in the form of a stack. As the platform is drawn from beneath the load the forward end portion of the platform will be gradually lifted by the action of the spring 36, thereby tilting the front end portion of the platform upwardly, causing the platform to form a downwardly and rearwardly inclined plane over which the load will be readily discharged. After the load has been discharged the lever 31 is restored to engagement with the hook 32, thereby lifting the rearward end of the platform and placing the device in condition to receive another load.

Having thus described the invention, what is claimed as new, is:—

1. In a device of the class described, a wheeled platform comprising a plurality of longitudinal bars spaced apart, means for tiltably supporting the rearward end of the platform to enable the same to be raised and lowered with respect to the ground, and means for resiliently supporting the forward end of the platform to permit the same to sag under the weight of a load placed thereon permitting portions of said load to engage the ground intermediate the longitudinal bars.

2. In a device of the class described, a platform comprising spaced longitudinal bars, a front axle having ground wheels, a member connected pivotally with the platform for movement in a vertical plane and connected pivotally with the front axle to permit the latter to swing in an approximately horizontal plane, a supporting spring connecting said member with the platform, a stop member to limit the upward movement of the platform under the tension of the spring, and means for so supporting the rearward end of the platform as to permit said rearward end to be raised and lowered.

3. A platform composed mainly of longitudinally disposed parallel bars arranged in spaced relation, a rear axle having a crank portion, bearings on the rearward end of the platform in which the crank portion of the axle is journaled, a reach bar extending forwardly with respect to the platform, a yoke pivoted on the reach bar and having a forked limb provided with a stop member to limit the movement of the reach bar with respect to the yoke, a spring connecting the yoke with the reach bar to hold the latter normally in engagement with the stop member, an arm projecting forwardly from the yoke, an axle which carries the front supporting wheels, and a pivotal connection between said axle and the arm which extends from the yoke.

4. A platform composed mainly of longitudinally disposed parallel bars arranged in spaced relation, a rear axle having a crank portion, bearings on the rearward end of the platform in which the crank portion of the axle is journaled, a reach bar extending forwardly with respect to the platform, a yoke pivoted on the reach bar and having a forked limb provided with a stop member to limit the movement of the reach bar with respect to the yoke, a spring connecting the yoke with the reach bar to hold the latter normally in engagement with the stop member, an arm projecting forwardly from the yoke, an axle which carries the front supporting wheels, and a pivotal connection between said axle and the arm which extends from the yoke, in combination with means for tilting the crank portion of the rear axle to effect vertical adjustment of the rearward end of the platform, and means for limiting such tilting movement.

5. In a device of the class described, a wheeled platform, means for resiliently supporting the forward end of the platform, a rear axle having a crank portion and wheel carrying spindles, bearings on the rearward end of the platform in which the crank portion of the axle is journaled, a cross bar near the rearward end of the platform having upstanding brackets provided with laterally extending lugs, said lugs being positioned in the path of the limbs of the axle when the latter is tilted to lower the rearward end of the platform, a lever fixedly connected with and extending forwardly with respect to one of the limbs of the axle, and engaging means for said lever to retain the rearward end of the platform in a raised position.

In testimony whereof I affix my signature.

LEONARD LEVENS.

Copies of this patent may be obtained for five cents each, by addressing the "Commissioner of Patents, Washington, D. C."